(12) United States Patent
Aihara

(10) Patent No.: US 6,491,447 B2
(45) Date of Patent: Dec. 10, 2002

(54) OPTICAL DEVICE MODULE

(75) Inventor: Shuichi Aihara, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 40 days.

(21) Appl. No.: 09/736,152

(22) Filed: Dec. 15, 2000

(65) Prior Publication Data

US 2001/0004413 A1 Jun. 21, 2001

(30) Foreign Application Priority Data

Dec. 16, 1999 (JP) .......................................... 11-357478

(51) Int. Cl.[7] .................................................. G02B 6/42
(52) U.S. Cl. .......................................... 385/92; 385/89
(58) Field of Search ........................ 385/88–89, 47–49, 385/52, 92–93

(56) References Cited

U.S. PATENT DOCUMENTS

| 4,732,446 | A | 3/1988 | Gipson et al. |
| 5,073,003 | A | 12/1991 | Clark |
| 5,764,832 | A | 6/1998 | Tabuchi |
| 5,898,803 | A | 4/1999 | Mueller-Fiedler et al. |
| 5,987,202 | A | 11/1999 | Gruenwald et al. |
| 6,198,864 | B1 * | 3/2001 | Lemoff et al. ................. 385/47 |

FOREIGN PATENT DOCUMENTS

| JP | 01305789 | 11/1989 |
| JP | 07099339 | 11/1995 |

* cited by examiner

Primary Examiner—Akm E. Ullah
Assistant Examiner—Jerry T Rahll
(74) Attorney, Agent, or Firm—Connolly Bove Lodge & Hutz LLP

(57) ABSTRACT

On one side of a transparent structure 31 molded of glass, plastics or the like there is formed integrally therewith a prismatic protrusion 31A, and an optical fiber 15 is disposed on the transparent structure 31 and positioned with its one end face abutted against a positioning surface 33 of the prismatic protrusion 31A. A light emitting or receiving device 37 is positioned relative to the other side of the transparent structure 31 by using fiducial marks and fixedly disposed by face down bonding in opposing relation to the prismatic protrusion 31A. Between the light emitting or receiving surface of the light emitting or receiving device 37 and a core exposed in one end face of the optical fiber 15 abutting against the positioning surface 33 there is formed an optical path in which a slope 34 of the prismatic protrusion 31A serves as a reflecting surface.

9 Claims, 9 Drawing Sheets

OPTICAL DEVICE MODULE

BACKGROUND OF THE INVENTION

The present invention relates to an optical device module in which a light emitting device which emits light from its surface substantially at right angles thereto, such as a laser diode, or a light receiving device which receives light substantially at right angles to its surface, such as a photo diode (which elements will hereinafter be generically referred to as an optical semiconductor device) and the optical path of an optical waveguide member such as an optical fiber or optical waveguide board, i.e. the core of the optical fiber or the optical waveguide of the optical waveguide board, are interconnected by an optical path bent substantially at right angles.

FIG. 9 is a diagrammatic showing of a conventional optical device module of this kind proposed in Japanese Patent Application Laid-Open Gazette No. 08-21930. Reference numeral 12 denotes a photo detector disposed in a casing 11, 13 a window made in the top panel of the casing 11, 14 a condenser lens fitted in the window 13, 15 an optical fiber disposed on the top of the casing 11, and 16 a reflecting surface formed by cutting one end face of the optical fiber 15 at an angle of about 45 degrees. Light propagated through the optical fiber 15 is bent at right angles by the reflecting surface 16 and gathered by the condenser lens 14 for incidence on the photo detector 12 as indicated by the broken line. In FIG. 3 of the above-mentioned official gazette there is also proposed such a construction as depicted in FIG. 10 in which the end face of the optical fiber 15 is perpendicular to its axis and the end face abutted against a prism 17 so that the light from the optical fiber 15 is bent at right angles by the prism 17 as indicated by the broken line.

In Japanese Patent Application Laid-Open Gazette No. 10-160959 there is proposed a conventional optical device module of this kind. As depicted in FIGS. 11 and 12, a frame-like guide block 21 with a rectangular opening has formed integrally therewith a guide prism 22, an optical fiber is disposed in each recess 23 of the guide block 21 with the end face of the optical fiber 15 abutted against the guide prism 22, and a light receiving device 24 is fitted in the frame of the guide block 21. Light from the optical fiber 15 is bent by the guide prism 22 for incidence on the light receiving device 24.

However, the prior art example of FIG. 9 suffers much difficulty in aligning the point of incidence on the reflecting surface 16 of the optical fiber 15, the axis of the lens 13 and the light-receiving center of the photo detector 12; hence, it is not easy to launch the light from the optical fiber 15 into the photo detector 12 with high efficiency. In the example of FIG. 10, too, it is very difficult to align the reflecting-point of the prism 17, the axis of the lens and the light-receiving center of the photo detector.

In the example of FIGS. 11 and 12, the abutment of the end face of the optical fiber 15 against one side of the guide prism 22 ensures accurate positioning, but the light receiving device 24 needs to be fitted snugly in the frame of the guide block 21. To meet this requirement, it is necessary that the inside dimensions of the frame of the guide block 21 and/or outside dimensions of the light receiving device 24 be adjusted for each optical device module. Hence, the illustrated structure lacks general versatility. Moreover, the light receiving device 24, once fitted in the frame of the guide block 21, is fixed and its position cannot be adjusted so that its light receiving surface is placed at a correct position.

It is therefore an object of the present invention to provide an optical device module free from the above-mentioned defects of the prior art.

SUMMARY OF THE INVENTION

According to the present invention, there is provided an optical device module comprising:

an optical waveguide member having at least one optical path, the optical waveguide member having a light emitting or receiving surface substantially at right angles to the longitudinal direction of the at least one optical path;

a transparent structure having a first side which supports one end portion of the optical waveguide member and a second side opposite the first side;

an optical semiconductor device disposed opposite said second side of the transparent structure and having a light emitting or receiving surface substantially at right angles to the second side of the transparent structure;

a plurality of positioning marks placed in the second side of the transparent structure for positioning the optical semiconductor device and the transparent structure relative to each other in a plane parallel with the second side of the transparent structure;

optical semiconductor device support means for supporting the optical semiconductor device on the second side of the transparent structure; and a prismatic protrusion formed integrally with the transparent structure on the first side thereof;

wherein the prismatic protrusion has a positioning surface which extends substantially at right angles to the first side of said transparent structure for abutment with one end face of the optical waveguide member to position the optical waveguide member and a reflecting surface which crosses an extension of the at least one optical path of the optical waveguie member abutted against the positioning surface and slopes with respect to the first side of the transparent structure to form between the end face of the optical path and the optical semiconductor device a bent optical route passing through the transparent structure.

DETAILED DESCRIPTION OF THE PREFERRED EMBODIMENTS

Figure 1A:
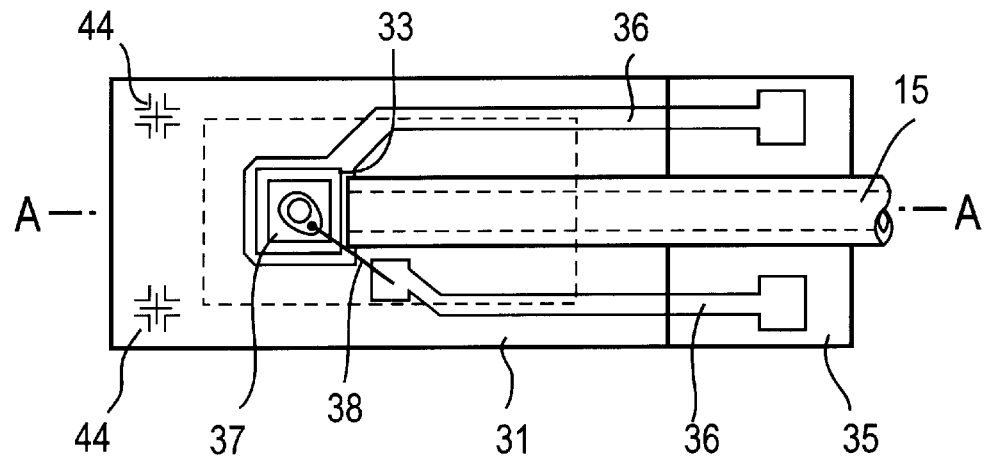
FIG. 1A is a plan view illustrating an embodiment according to a first aspect of the present invention.
Figure 1B:
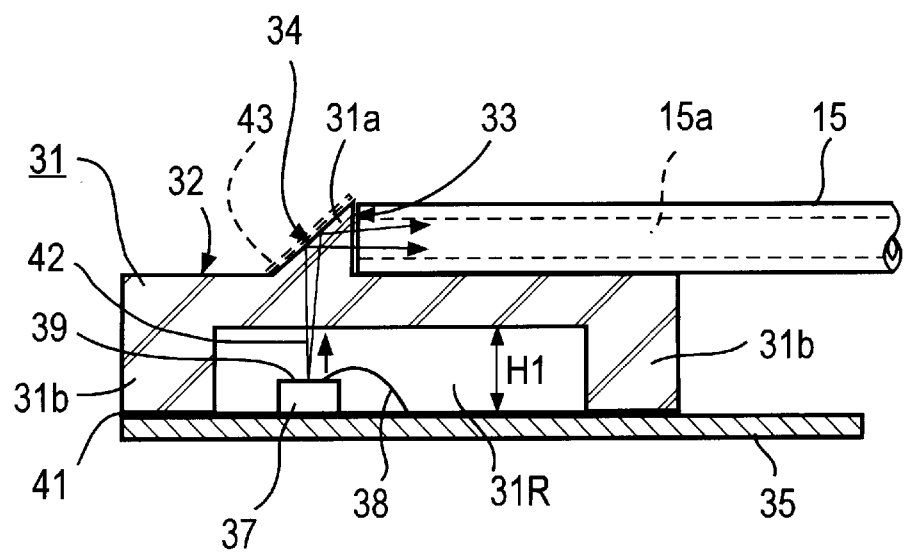
FIG. 1B is a sectional view taken along the line A—A in FIG. 1A.

FIGS. 1A and 1B illustrate an embodiment according to the first aspect of the present invention which employs an optical fiber 15 as an optical waveguide member. Reference numeral 31 denotes a substantially rectangular transparent structure molded of transparent glass or transparent synthetic resin. The transparent structure 31 has a prismatic protrusion 31a formed integrally therewith on one surface, in this example, on the top 32 of the structure 31. The prismatic protrusion 31a has a positioning surface 33 substantially vertical to the top 32 of the transparent structure 31 and a reflecting surface 34 forming an angle of approximately 45 degrees with respect to the positioning surface 33, that is, oblique to the top 32 of the transparent structure 31. The height of the positioning surface 33 from the top 32 of the transparent structure 31 is about the same as or larger than the diameter of the optical fiber 15. One end face of the optical fiber 15 placed on the top 32 of the transparent structure 31 is abutted against the positioning surface 33 so that the optical fiber 15 is positioned horizontally. The optical fiber 15 is disposed substantially at right angles to the positioning surface 33.

In the underside of the transparent structure 31 on the side thereof opposite the prismatic protrusion 31a there is formed a rectangular recess 31R surrounded by a square frame-shaped support wall 31b along the marginal edge of the underside of the transparent structure 31. A wiring board 35 is attached in abutting relation to the end face of the frame-shaped support wall 31b in parallel with the underside of the transparent structure 31. The wiring board 35 is a printed wiring board of glass epoxy or ceramics, which has printed on the side thereof facing the transparent structure 31 a conductor pattern 36 forming an electrode, terminals and lead wires interconnecting them. On the electrode portion of the conductor pattern 36 there is placed an optical semiconductor device 37 by soldering, for instance. An electrode on the optical semiconductor device 37 and the electrode of the conductor pattern 36 are interconnected by a bonding wire 38. The optical semiconductor device 37 is disposed with its device surface, in this example, its light emitting surface 39, held opposite the reflecting surface 34 of the prismatic protrusion 31a across the transparent structure 31.

The wiring board 35 and the transparent structure 31 are assembled in such a way as described below. In the first place, the wiring board 35 is positioned relative to the transparent structure 31 in adjacent but spaced relationship to the lower end face of the support wall 31b, and then moved vertically into abutment thereon in such a manner as to cover the recess 31R surrounded by the support wall 31b. Thereafter, for example, an ultraviolet setting adhesive layer 41 is irradiated with ultraviolet rays to cure the adhesive layer, and consequently, the wiring board 35 hermetically seals and separates the recess 31R of the transparent structure 31 from the outside. The optical semiconductor device 37 is placed on the wiring board 35 in the recess 31R. Thus, the optical semiconductor device 37 is sealed in the recess 31b for protection. Since the transparent structure 31 and the wiring board 35 define the recess 31R as mentioned above, the overall size of the module can be reduced accordingly.

As described above, in this embodiment the wiring board 35 having the adhesive layer 41 serves as a means for supporting the optical semiconductor device 37 in the transparent structure 31. With such an arrangement, light 42 emitted from the optical semiconductor device or light emitting element 37 having a light emitting end face on the side opposite the wiring board 35 somewhat spreads and strikes on the prismatic protrusion 31a of the transparent structure 31. The incident light is reflected 90 degrees by the reflecting surface 34 of the protrusion 31a which forms an angle of 45 degrees with respect to the axis of emitted light from the light emitting device 37. The reflected light passes through the positioning surface 33 of the protrusion 31a and impinges on the core 15a (an optical path) of the optical fiber 15. In this instance, if the angle of total reflection is equal to or smaller than 45 degrees which is determined by the relative refractive index of the transparent structure 31, total reflection of the emitted light from the light emitting device 37 occurs on the reflecting surface 34 of the transparent structure 31, permitting the incidence of approximately the entire quantity of emitted light on the core 15a of the optical fiber 15. When the total reflection is hard to occur, its reflection efficiency of the reflecting surface 34 can be increased as by evaporating metal it to form a mirror 43.

If the ratio between the total quantity of light emitted from the light emitting device 37 and the quantity of light incident on the optical fiber 15 is defined as optical coupling efficiency, the optical coupling efficiency in this case is determined by a scattering loss on the total reflection surface, the spreading of the emitted light on the end face of the optical fiber 15, and deviations between the optical axes of the emitted and the reflected light and the optical axis of the optical fiber 15. In the case where the reflection loss is zero, the light emitting device 37 is a point source and the spread angle of the emitted light is 10 degrees, the emitted light in an optical path 0.6 mm apart from the light emitting device 37 becomes a ray bundle 0.105 mm in diameter. With a 0.105 mm diameter core of the optical fiber 15, it is possible to achieve an optical coupling efficiency of approximately 100% when the respective optical axes are held in alignment.

The transparent structure 31 (including the protrusion 31a and the support wall 31b) can be molded of glass or similar material. This can be said to provide a high optical coupling efficiency with more ease and at lower cost than in the case of a conventional method of forming a similar reflecting surface by obliquely cutting an optical fiber.

For accurate and easy positioning of the light emitting device 37 and the reflecting surface 34 relative to each other so as to ensure efficient incidence of the emitted light from the light emitting device 37 on the optical fiber 15, at lease three positioning marks 44 are placed in each of the end face of the support wall 31B of the transparent structure 31 and the wiring board 35 at the positions where they are to be put together. The transparent structure 31 is held above the wiring board 35 and their positioning marks 44 are aligned visually from above, after which the transparent structure 31 and the wiring board 35 are bonded to each other. The positioning marks 44 in the wiring board 35 can be placed simultaneously with the formation of the conductor pattern 36. The positioning marks 44 may be fiducial marks. The positioning marks can be formed with an accuracy of 50 μm in the case of a glass epoxy wiring board and with an accuracy of 10 μm in the case of a ceramic wiring board. The positioning marks on the transparent structure 31 can be formed, for example, by masked evaporation of metal with an accuracy of the submicron order. This allows ease in attaining a relative accuracy of, for instance, 5 μm or below that is usually needed in GI-500MMF (a graded index type 50 μm multimode optical fiber).

Incidentally, it is preferable in terms of optical coupling efficiency that the height H1 of the support wall 31b be minimized within the range in which not to interfere the bonding wire 38.

In the embodiment of FIG. 1, the coupling efficiency of approximately 100% can be achieved by the alignment of the optical axes of the emitted light and the core of the optical fiber 15 and the coincidence of the diameter of the emitted light with the core diameter of the optical fiber 15. By limiting the spread of the emitted light to be smaller than the core diameter of the optical fiber 15 (in the case of an optical waveguide member, the diameter of the optical waveguide), it is also possible to launch approximately 100% of the emitted light from the light emitting device 37 into the optical fiber 15 even if the optical axes somewhat deviate from each other. That is, when the diameter of the emitted light at the end face of the optical fiber 15 is smaller than the core diameter as depicted n FIGS. 2 to 4, the difference in diameter can be used as a margin of the deviation between the optical axes—this relaxes the requirements for accuracy in mounting respective devices and parts.

Figure 2A:
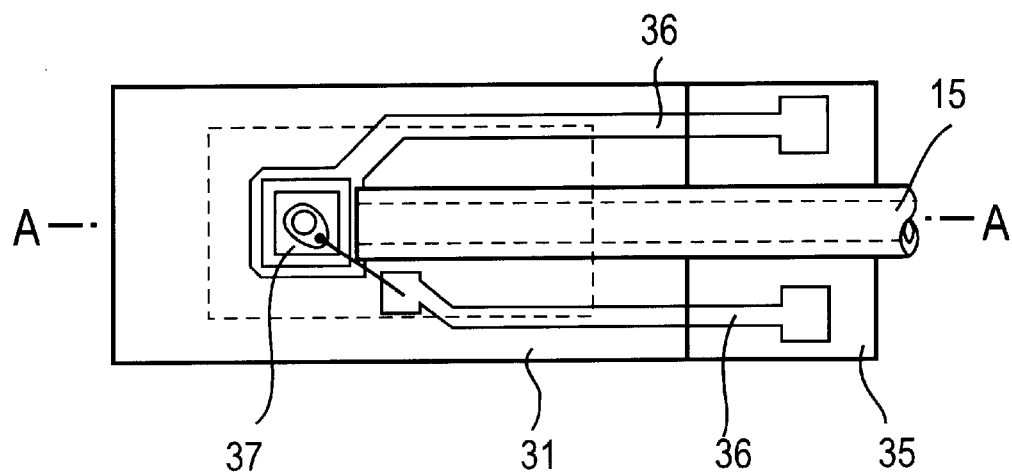
FIG. 2A is a plan view illustrating another embodiment according to the first aspect of the present invention.
Figure 2B:
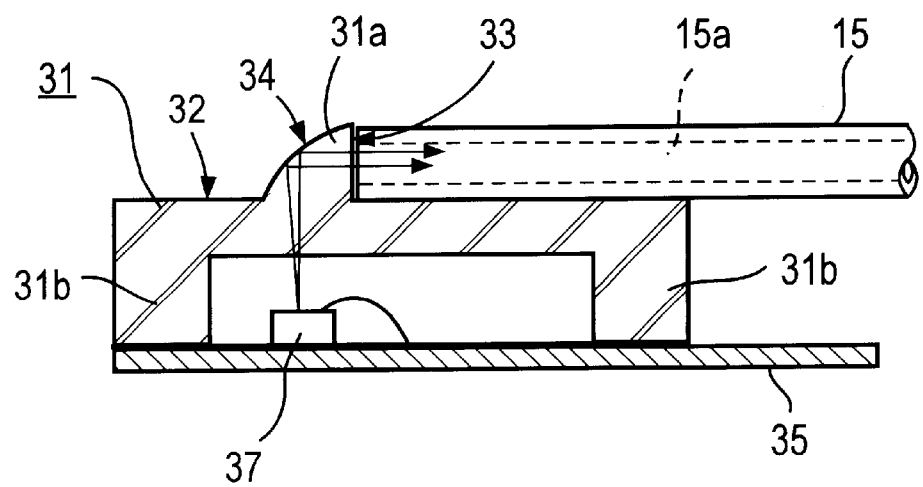
FIG. 2B is a sectional view taken along the line A—A in FIG. 2A.

FIGS. 2A and 2B illustrate another embodiment of the present invention in which the reflecting surface 34 of the prismatic protrusion 31a is formed, for example, as a paraboloid (of revolution) to thereby light-gathering power. By making the curved surface in parabolic form and aligning the center of the light emitting surface of the light emitting device 37 with the focal point of the paraboloid, reflected rays of light from the reflecting surface 34 become parallel rays, that is, the reflected light is kept from spreading, and consequently, the diameter of the ray bundle at the end face of the optical fiber 15 can be made smaller than the core diameter.

Figure 3:
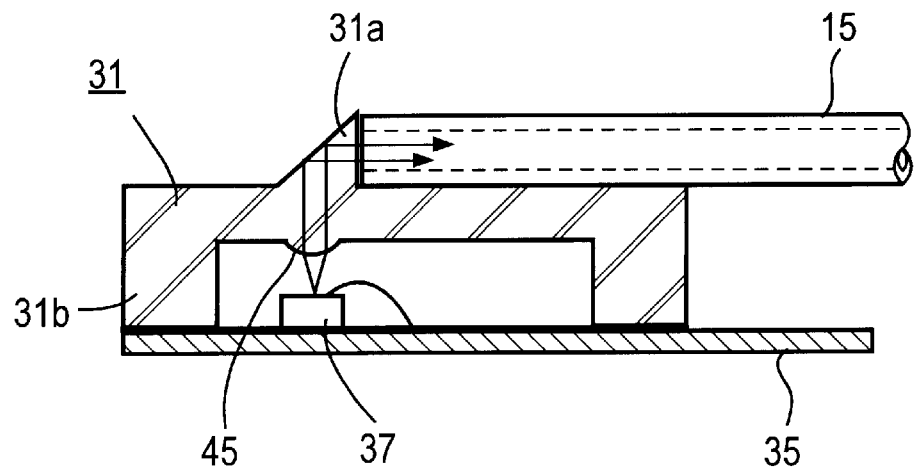
FIG. 3 is a sectional view similar to FIG. 1B, illustrating another embodiment according to the first aspect of the present invention.
Figure 4:
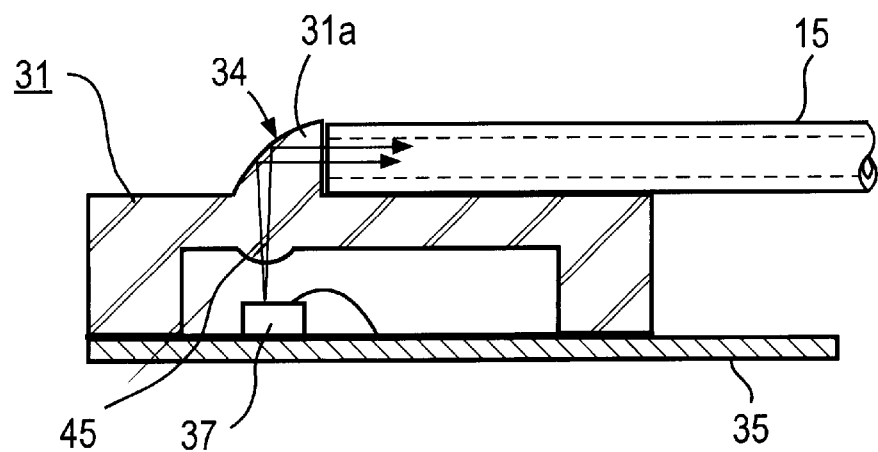
FIG. 4 is a sectional view similar to FIG. 1B, illustrating still another embodiment according to the first aspect of the present invention.

In the FIG. 3 embodiment a convexity 45 is formed in the underside of the transparent structure 31 facing the light emitting device 37 in the FIG. 1 embodiment so that the convexity 45 serves as a lens, and this function is the same as is obtainable with the FIG. 2 embodiment. While the lens is shown to be a convex lens as a physical structure, it is also possible to employ a Fresnel lens or microplanar lens that provides the same function as the convex lens by partly changing the refractive index of the transparent structure 31. In this instance, the curved surface 45 is not formed. The FIG. 4 embodiment is a combination of the embodiments of FIGS. 2 and 3. As depicted in FIG. 4, the light-gathering power is provided in the reflecting surface 34 and in the underside of the transparent structure 31 facing the light emitting device 37.

The above-described embodiments are intended to raise the limitations on the degree of accuracy in mounting parts by reducing the diameter of the ray bundle, but the alignment of respective optical axes requires a high degree of precision in mounting the light emitting device 37 on the board 35, in mounting the transparent structure 31 on the board 35 and in connecting the transparent structure 31 and the optical fiber 15 to each other. The mounting accuracy for aligning the optical axes can be enhanced by placing the optical fiber 15, the transparent structure 31 and the light emitting device 37 at certain fiducial points (parts) as well as by improving the mounting precision.

Figure 5C:
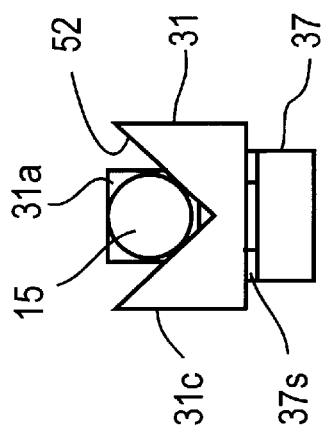
FIG. 5C is a right side view of FIG. 5A.
Figure 5A:
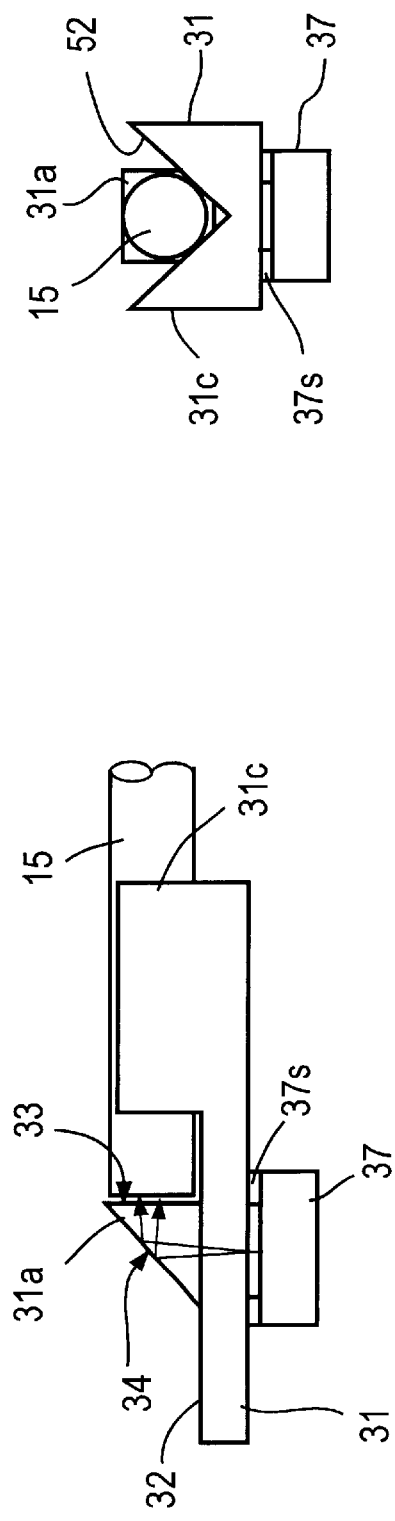
FIG. 5A is a front view illustrating an embodiment according to a second aspect of the present invention.
Figure 5B:
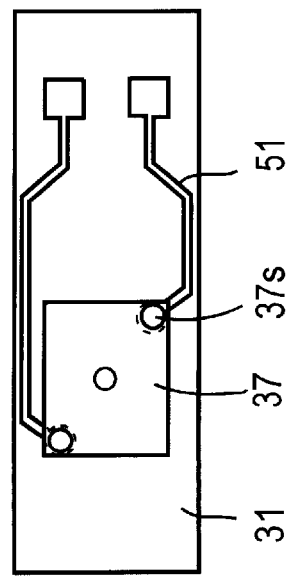
FIG. 5B is a bottom view of FIG. 5A.

FIGS. 5A to 5C illustrate an embodiment according to the second aspect of the present invention which is designed to provide increased mounting accuracy. This embodiment uses an optical fiber as the optical waveguide member and a light emitting device as the semiconductor device. In this embodiment the transparent structure 31 is as a fiducial part, on which the optical fiber 15 and the light emitting device 37 are mounted. Reference numeral 31c denotes a thick-walled portion which is formed integrally with the top 32 of the rectangular transparent structure 31 and has a V-shaped groove 52 cut therein and extending about halfway from one end of the transparent structure 31 lengthwise. In this embodiment, too, as is the case with the above-described embodiment, the prismatic protrusion 31a is formed integrally with top 32 of the transparent structure 31 in adjacent but spaced relation to the end face of the V-shaped groove 52, and the prismatic protrusion 31a forms the positioning surface 33 and the reflecting surface 34. The end face of the optical fiber 15 is abutted against the positioning surface 33 so that the optical fiber 15 is positioned in the side-to-side direction.

On the underside of the transparent structure 31 there is formed a conductor pattern 51 including an electrode, to which an electrode formed on one side of the light emitting device 37 is connected, for example, through a solder bump 37S by a flip-chip mounting technique such as face down bonding in this example, not by wire bonding. Thus, the light emitting device 37 is mounted directly on the underside of the transparent structure 31 with the optical axes of the reflecting surface 34 and the optical fiber 15 held in alignment with the optical axis of the light emitting device 37. The solder adhesive layer by the solder bump 37S serves to support the light emitting device 37 on the transparent structure 31. In this embodiment the transparent structure 31 has the above-mentioned V-shaped groove 52 as a guide which enables the optical fiber 15 to be aligned with the optical axis of the light reflected off the reflecting surface 34 and hence allows ease in mounting the optical fiber 15 in alignment with the optical axis of the light emitted from the light emitting device 37. This embodiment uses the optical fiber, which is positioned by the V-shaped guide structure. Accordingly, the V-shaped groove 52 extends substantially at right angles to the positioning surface 33. This embodiment also permits relative positioning of the light emitting device 37 and the transparent structure 31 in the plane parallel to the underside of the latter.

In the conventional face down bonding (which is referred to also as flip-chip bonding) it is customary to utilize an image recognition system in which: a probe equipped with image pickup means is inserted into the space between the surface of the light emitting device and the surface of the wiring board to be bonded; images of the both surfaces are alternately picked up; their relative position is judged and determined after processing the picked up images; and the both surfaces are bonded after pulling out the probe from the space between them.

Since in this embodiment the wiring board side is the transparent structure 31, their relative positioning can be achieved simply by visual observation or picking up their images from above the top of the transparent structure 31. The positioning can be accomplished with reference to the electrode on the transparent substrate and the electrode of the light emitting device 37 that are to be interconnected; however, it is also possible to place fiducial mark on the transparent structure so that it is positioned with respect to a part of the light emitting device 37 such as an electrode that is not connected to the transparent structure, or its light emitting surface, or a swelled portion in the case of a mesa structure. Furthermore, it is possible to place a fiducial mark on the light emitting device 37 as well for alignment with the counterpart on the transparent structure 31.

Figure 6A:
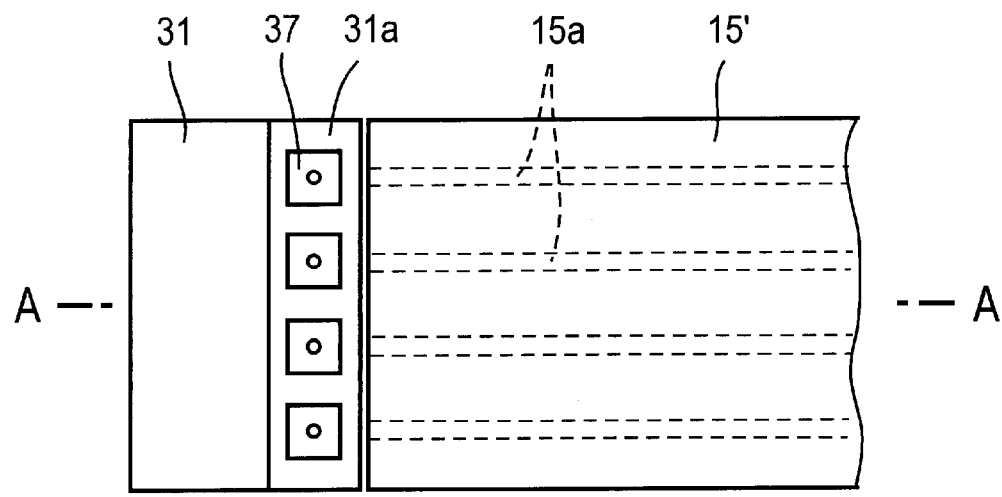
FIG. 6A is a plan view illustrating another embodiment according to the second aspect of the present invention.
Figure 6B:
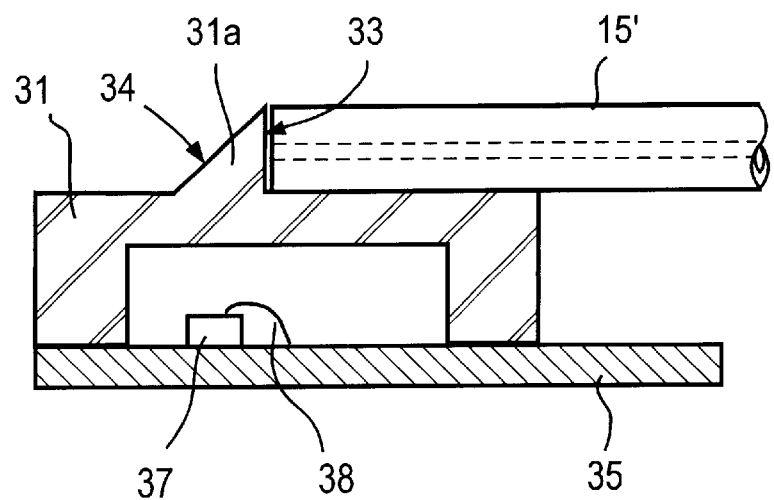
FIG. 6B is a sectional view taken along the line A—A in FIG. 6A.

While in the above one optical waveguide and one optical semiconductor device are coupled together on the transparent structure 31, it is also possible to couple pluralities of optical waveguides and optical semiconductor devices on the transparent structure 31 as depicted in FIGS. 6A and 6B. A tape fiber 15' having plural cores 15a arranged in parallel is abutted at one end against the positioning surface 33 of the prismatic protrusion 31a formed integrally with the transparent structure 31 on the top thereof and having the same length as the width of the tape fiber 15'. The optical axes of the cores 15a are bent by the reflecting surface 34 of the protrusion 31a so that they pass through the transparent structure 31 and reach the individual light emitting devices 37 disposed on the wiring board 35. In the FIG. 6 embodiment the light emitting devices 37 may be mounted on the transparent structure 37 as depicted in FIG. 5. The tape fiber 15' may be substituted with an optical waveguide member having plural optical waveguides formed side by side.

Figure 7:
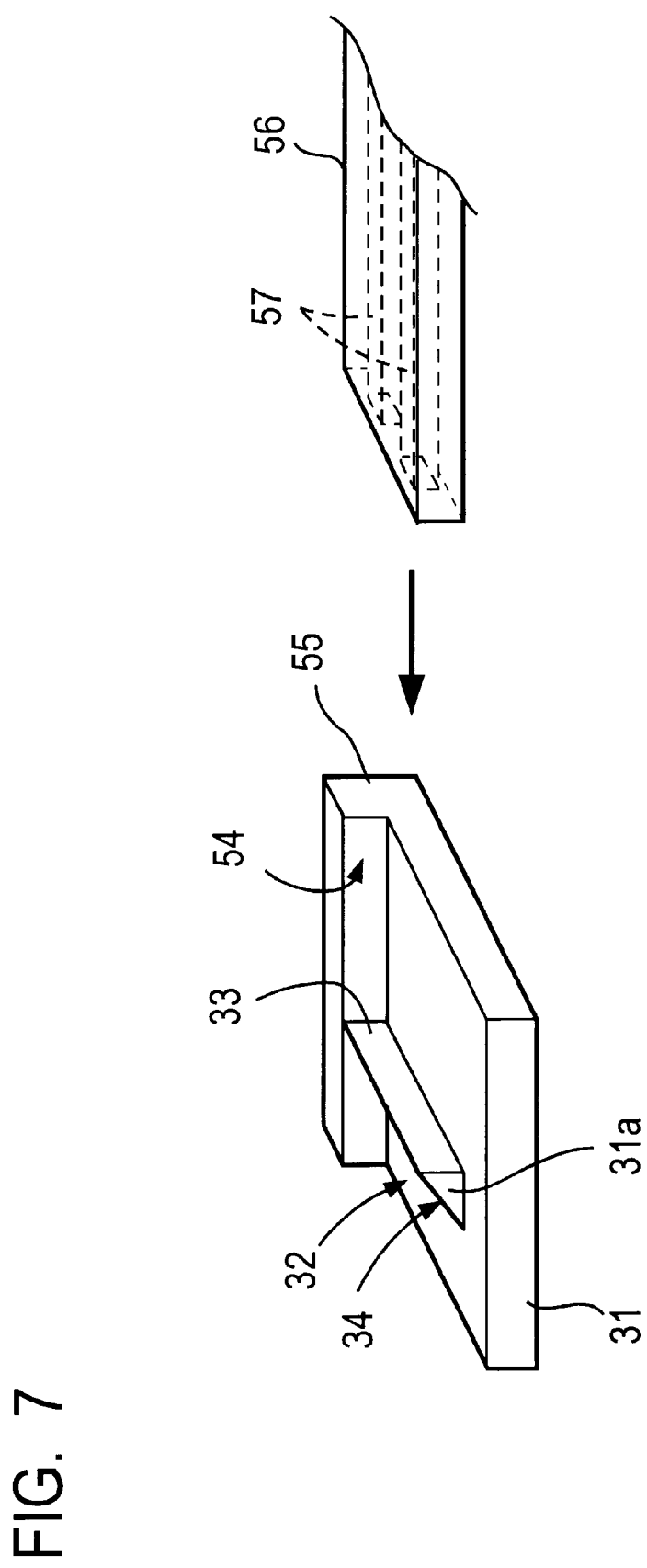
FIG. 7 is a perspective view depicting part of another embodiment of the present invention.

In the above the position of the core 15a of the optical fiber 15 is determined only by the positioning surface 33 of the transparent structure 31, but it may also be positioned in a two-dimensional plane as depicted in FIG. 7. In FIG. 7 there is protrusively provided on the top 32 of the transparent structure 31 a guide portion 55 having a reference surface 54 perpendicular to the positioning surface 33 and the top 32. The end face of an optical waveguide member 56 is abutted against the positioning surface 33 with one side of the waveguide member 56 held in abutment on the reference surface 54; thus, the optical waveguide member 56 is positioned in the twodimensional plane on the transparent structure 31. Incidentally, the optical waveguide member 56 is shown to have a plurality of optical waveguides or optical paths arranged side by side. Though not shown in FIG. 7, the optical semiconductor devices 37 are placed on the wiring board 35 in a one-to-one correspondence with the plurality of optical waveguides as depicted in FIGS. 1A and 1B, or mounted by face bonding on the underside of the transparent structure 31 as depicted in FIG. 5. In FIG. 7 the optical waveguide member 56 having the plurality of optical waveguides 67 is used, but this structure is applicable as well to the optical waveguide member having one optical waveguide. The optical waveguide member 56 may be the optical tape fiber 15' depicted in FIG. 6.

Figure 8B:
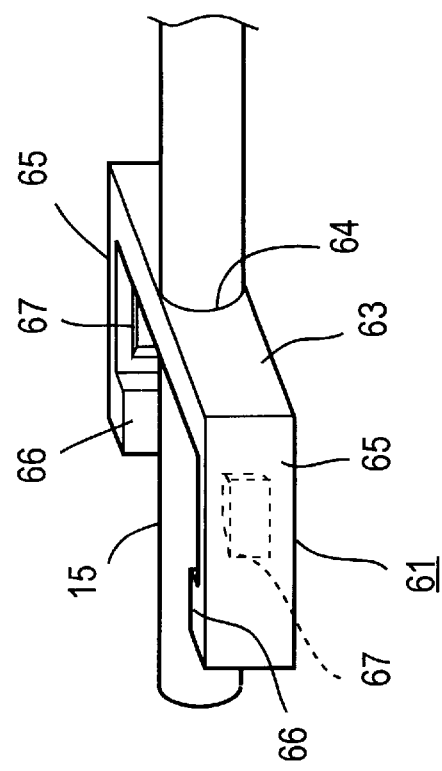
FIG. 8B is a perspective view showing an example of an optical fiber equipped with a connector 61 for reception by the receptacle 62.
Figure 8A:
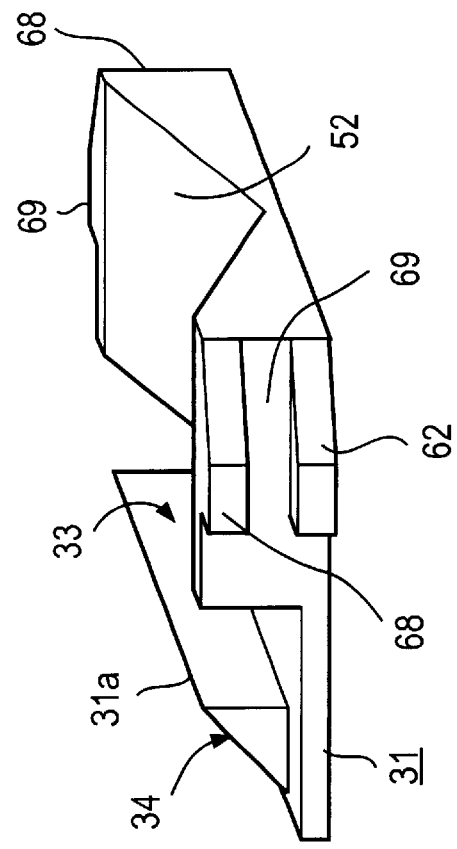
FIG. 8A is a perspective view showing an example in which a transparent structure 31 is equipped with a receptacle 62.
Figure 9:
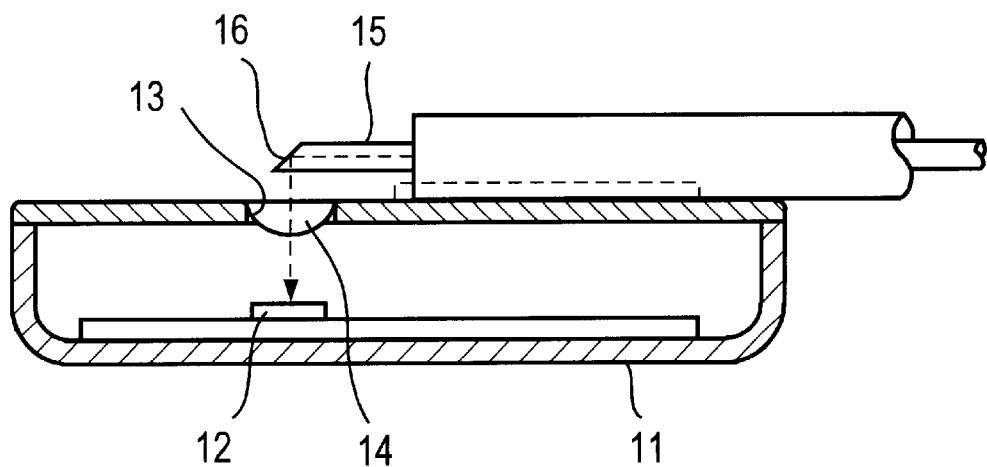
FIG. 9 is a sectional view depicting a conventional optical device module.
Figure 10:
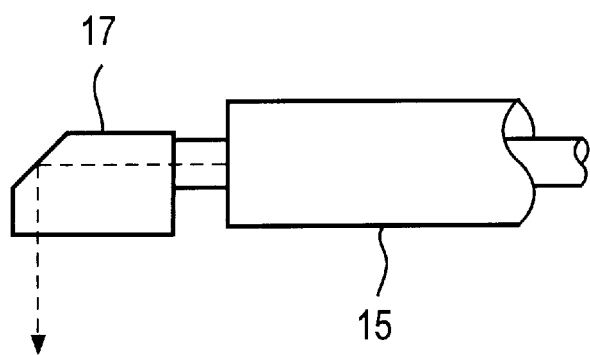
FIG. 10 is a diagram showing a modified form of the optical device module depicted in FIG. 9.
Figure 11:
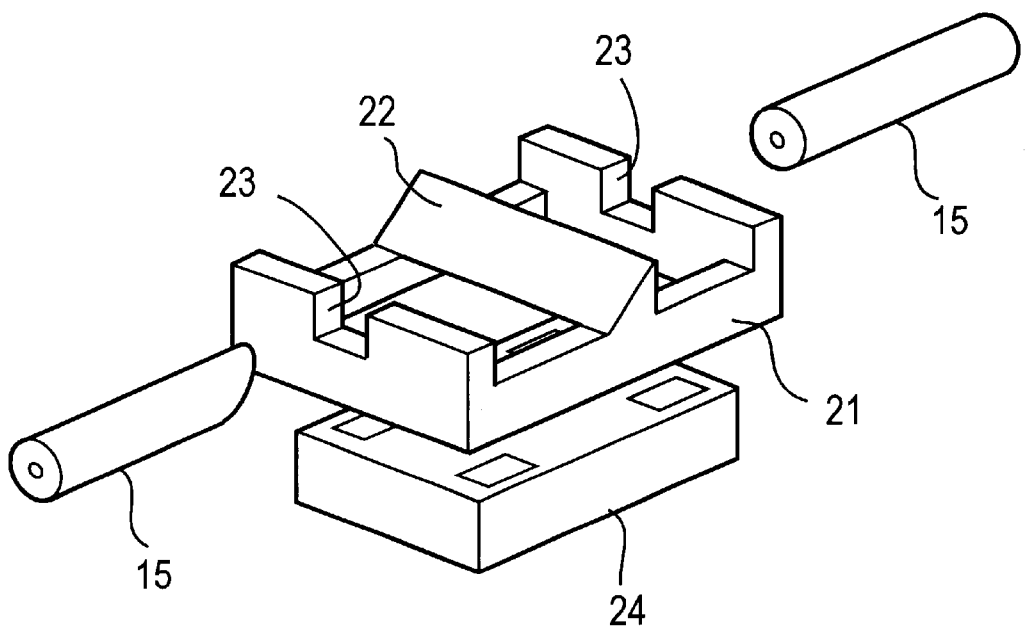
FIG. 11 is an exploded perspective view depicting another conventional optical device module.
Figure 12:
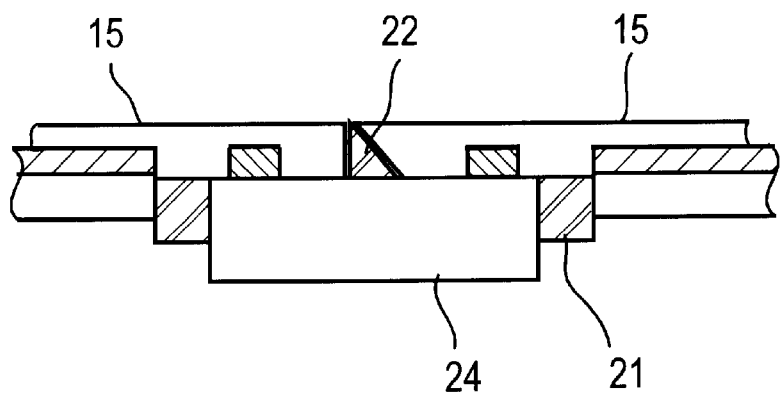
FIG. 12 is a sectional view of the optical device module of FIG. 11 in its assembled form.

FIG. 8 illustrates a modified form of the FIG. 5 embodiment, in which the optical fiber 15 and the transparent structure 31 are equipped with a connector 61 and a receptacle 62, respectively, so that the former is detachably mounted on the latter. The connector 61 has: a through hole 64 in, for example, a thick rod-like coupling portion 63 centrally thereof, through which the optical fiber 15 is inserted and fixed therein; a pair of parallel engaging pieces 65 extending in the same direction from opposite ends of the coupling portion 63; a pair of hooks 66 protrusively provided on the tip end portions of the engaging pieces 65 in opposing relation to the optical fiber 15; and a pair of keys 67 protrusively provided on the inside surfaces of the engaging pieces 66 and extended in the same direction as the optical fiber 15. The coupling portion 63, the engaging pieces 65, the hooks 66 and the keys 67 are integrally molded of a synthetic resin material, and the opposite end portions of the engaging pieces 65 can be elastically pushed apart.

The receptacle 62 for receiving the connector 61 is shown to be formed integrally with the transparent structure 31 that has formed integrally therewith the V-shaped groove 52 for guiding and positioning the optical cable 15. The thick-walled portion with the V-shaped groove 52 cut therein has a pair of engaging portions 68 outwardly projecting from each side surface thereof to thereby define a key groove 69 which extends substantially at right angles to the positioning surface 33 of the prismatic protrusion 31a. Those portions of the two pairs of engaging portions 68 on the side thereof opposite the protrusion 31a are gradually protruded, that is, tapered so that the spacing of the engaging portions 68 on the both sides of the thick-walled portion gradually increases toward the positioning surface 33.

When pressed against the transparent structure 31 toward the positioning surface 33, the engaging pieces 65 of the connector 61 are elastically pushed outward in the opposite directions by the tapered surfaces of the engaging portions 68. The hooks 66 slide over the engaging portions 68 and snap elastically into engagement with the side surfaces of the engaging portions 68 on the side thereof facing the positioning surface 33, thereby assembling the connector 61 and the receptacle 62 into a unitary structure. In this case, the coupling portion 68 of the connector 61 abuts against the end face of the transparent structure 31 and the end face of the optical fiber 15 abuts against or lies adjacent the positioning surface 33, whereby the optical fiber 15 is positioned in the direction perpendicular to the positioning surface 33. The keys 65 are inserted in and guided by the key grooves 69 and the optical fiber 15 is inserted in the V-shaped groove 52 just in the center thereof, whereby the optical fiber 15 is positioned in the planes parallel with and vertical to the transparent structure 31, respectively.

Though not shown in FIG. 8, the optical semiconductor device 37 is mounted on the transparent structure 31 as depicted in FIG. 1 or 5. The FIG. 8 embodiment has been described to be applied to the optical coupling of the optical fiber 15 and the optical semiconductor device 37, but the illustrated structure is applicable as well to the optical coupling of the tape fiber 15' and a plurality of optical semiconductor devices 3. Similarly, the connector-receptacle structure can be applied to the combination of the optical waveguide member having one or more optical waveguides and the optical semiconductor device or devices.

Furthermore, in the embodiments of FIGS. 1 to 5, the optical waveguide member can be used in place of the optical fiber 15. While in the above the optical semiconductor device 37 has been described to be a light emitting device, it may also be light receiving element or photo detector. In the embodiments of FIGS. 5 to 8 the reflecting surface 34 may also be formed as such a light-gathering curved surface as described in respect of FIGS. 2, 3 and 4, and the portion of the transparent structure 31 facing the optical semiconductor device 37 may also be equipped with light-gathering lens power.

EFFECT OF THE INVENTION

As described above, according to the present invention, a prismatic protrusion is formed integrally with a blockshaped transparent structure on one side thereof and the vertical surface of the prismatic protrusion is used for positioning an optical waveguide member, and an optical semiconductor device is placed opposite the other side of the transparent structure. Since the optical semiconductor device is positioned using a positioning mark placed in the above-mentioned other side of the transparent structure, they can be fixedly assembled with a high degree of positioning accuracy—this provides high optical coupling efficiency.

What is claimed is:

1. An optical device module comprising:

an optical waveguide member having at least one optical path, said optical waveguide member having a light emitting or receiving surface substantially at right angles to the longitudinal direction of said at least one optical path;

a transparent structure having a first side which supports one end portion of said optical waveguide member and a second side opposite said first side;

an optical semiconductor device disposed opposite said second side of said transparent structure and having a light emitting or receiving surface substantially at right angles to said second side of said transparent structure;

a plurality of positioning marks placed in said second side of said transparent structure for positioning said optical semiconductor device and said transparent structure relative to each other in a plane parallel with said second side of said transparent structure;

optical semiconductor device support means for supporting said optical semiconductor device on said second side of said transparent structure; and a prismatic protrusion formed integrally with said transparent structure on said first side thereof;

wherein said prismatic protrusion has a positioning surface which extends substantially at right angles to said first side of said transparent structure for abutment with one end face of said optical waveguide member to position said optical waveguide member and a reflecting surface which crosses an extension of said at least one optical path of said optical waveguide member abutted against said positioning surface and slopes with respect to said first side of said transparent structure to form between said end face of said optical path and said optical semiconductor device a bent optical route passing through said transparent structure; and wherein said transparent structure has a conductor pattern formed on said second side and said optical semiconductor support means includes a bonding material for face-down bonding said light emitting or receiving surface of said optical semiconductor device to said conductor pattern.

2. The optical device module of claim 1, wherein said optical semiconductor support means includes a support wall projecting from said second side of said transparent structure at right angles thereto and integral therewith and having, as part of said second side, the projecting end face parallel therewith, and a wiring board fixed to said projecting end face of said support wall in opposing relation to said second side of said transparent structure, said optical semiconductor device being fixedly disposed on said wiring board opposite said second side of said transparent structure.

3. The optical device module of claim 2, wherein said plurality of positioning marks in said second side of said transparent structure are placed in said projecting end face of said support wall and said wiring board has placed therein positioning marks on the side thereof on which said optical semiconductor device is mounted, at the positions corresponding to said plurality of positioning marks placed in said second side of said transparent structure.

4. The optical device module of claim 2, or 1, wherein said optical waveguide member is an optical fiber and said transparent structure has cut in said first side thereof a V-shaped groove extending substantially at right angles to said positioning surface to accomplish positioning of said optical fiber.

5. The optical device module of claim 4, wherein said optical fiber is equipped with an optical connector and said transparent structure is equipped with a receptacle for detachably receiving said optical connector.

6. The optical device module of claim 2, or 1, wherein said optical waveguide member has at least one optical waveguide and said transparent structure has protrusively provided on said first side a guide portion having a reference surface for positioning one side surface of said optical waveguide member.

7. The optical device module of claim 2, or 1, wherein said reflecting surface of said prismatic protrusion is a curved surface having light-gathering power.

8. The optical device module of claim 2, or 1, wherein the surface portion of said transparent structure on the side thereof facing the device surface of said optical semiconductor device is formed as a convex lens.

9. The optical device module of claim 1, wherein said plurality of positioning marks are placed in said transparent structure on the side thereof on which said conductor pattern is formed, at positions corresponding to electrodes or structural features of said optical semiconductor device or some other marks.

* * * * *